US011690318B2

(12) United States Patent
Conrad et al.

(10) Patent No.: US 11,690,318 B2
(45) Date of Patent: Jul. 4, 2023

(54) DECK HEIGHT CONTROL SYSTEM

(71) Applicant: Mean Green Products, LLC, Hamilton, OH (US)

(72) Inventors: Joseph C. Conrad, Okeana, OH (US); Matthew C. Conrad, Okeana, OH (US)

(73) Assignee: Generac Power Systems, Inc., Waukesha, WI (US)

( * ) Notice: Subject to any disclaimer, the term of this patent is extended or adjusted under 35 U.S.C. 154(b) by 866 days.

(21) Appl. No.: 16/656,194

(22) Filed: Oct. 17, 2019

(65) Prior Publication Data
US 2020/0120866 A1 Apr. 23, 2020

Related U.S. Application Data

(60) Provisional application No. 62/746,658, filed on Oct. 17, 2018.

(51) Int. Cl.
*A01D 34/74* (2006.01)
*A01D 34/00* (2006.01)
(Continued)

(52) U.S. Cl.
CPC ........... *A01D 34/74* (2013.01); *A01D 34/008* (2013.01); *A01D 34/78* (2013.01); *A01D 69/02* (2013.01)

(58) Field of Classification Search
CPC ...... A01D 34/74; A01D 34/78; A01D 34/008; A01D 69/02
See application file for complete search history.

(56) References Cited

U.S. PATENT DOCUMENTS 4,622,714 A 11/1986 Tomasello
4,866,320 A 9/1989 Schulz
(Continued)

FOREIGN PATENT DOCUMENTS

EP 2732687 A1 * 5/2014 ............. A01D 34/58
EP 2767150 A1 * 8/2014 ........... A01D 34/008
(Continued)

OTHER PUBLICATIONS

International Search Report for PCT/US2019/56780 dated Jan. 9, 2020.
(Continued)

*Primary Examiner* — Alicia Torres
(74) *Attorney, Agent, or Firm* — James A. Joyce; Godfrey & Kahn, S.C.

(57) ABSTRACT

A deck height control system for use with a mower that has a deck positioned at a first height and is configured to support a blade motor. The control system includes an actuator that may be configured to vertically displace the deck from the first height to a second height. A deck system module may connect to the actuator and be capable of signaling the actuator, during operation, to displace the deck a particular deck distance in a particular vertical direction necessary to achieve the second height. The deck system module may further have a deck height memory capable of storing information relating to deck displacement activity. A control may connect to the deck system module and be capable of signaling the particular deck distance and particular vertical direction to the deck system module when engaged by an operator. A battery-operated mower may include the deck height control system.

10 Claims, 15 Drawing Sheets

(51) Int. Cl.
  *A01D 34/78* (2006.01)
  *A01D 69/02* (2006.01)

(56) References Cited

U.S. PATENT DOCUMENTS

| | | | |
|---|---|---|---|
| 4,969,102 A | | 11/1990 | Tamura et al. |
| 5,007,234 A | | 4/1991 | Shurman et al. |
| 5,011,058 A | | 4/1991 | Sapp et al. |
| 5,138,825 A | * | 8/1992 | Trefz .................. A01D 43/077 |
| | | | D15/15 |
| 5,195,208 A | | 3/1993 | Yamami et al. |
| 5,406,778 A | | 4/1995 | Lamb et al. |
| 5,502,957 A | | 4/1996 | Robertson |
| 5,547,341 A | | 8/1996 | Amin |
| 5,813,088 A | | 9/1998 | Wagner et al. |
| 5,816,033 A | * | 10/1998 | Busboom ................ A01D 34/74 |
| | | | 56/121.46 |
| 6,006,400 A | | 12/1999 | Presenza |
| 6,305,048 B1 | | 10/2001 | Salisian |
| 6,339,916 B1 | | 1/2002 | Benson |
| 6,370,729 B2 | | 4/2002 | Miyamoto |
| 6,526,624 B2 | | 3/2003 | Miyamoto |
| 6,592,329 B1 | | 7/2003 | Hirose et al. |
| 6,640,384 B2 | | 11/2003 | Sanders et al. |
| 6,843,639 B2 | | 1/2005 | Schuett |
| 6,987,328 B2 | | 1/2006 | Osborne |
| 7,055,213 B2 | | 6/2006 | Iida et al. |
| 7,077,078 B2 | | 7/2006 | Yuasa et al. |
| 7,096,597 B1 | | 8/2006 | Zellous |
| D533,266 S | | 12/2006 | Yoshida et al. |
| 7,621,019 B2 | | 11/2009 | Kremsler et al. |
| 7,712,751 B2 | | 5/2010 | Beal |
| 7,721,384 B2 | | 5/2010 | Crevling, Jr. et al. |
| 7,866,944 B2 | | 1/2011 | Kenyon et al. |
| 8,572,939 B2 | | 11/2013 | Koike et al. |
| 8,579,058 B1 | | 11/2013 | Yamada et al. |
| 8,701,806 B2 | | 4/2014 | Ishii et al. |
| 8,706,297 B2 | | 4/2014 | Letsky |
| 8,740,027 B2 | | 6/2014 | Manor et al. |
| 8,783,391 B2 | | 7/2014 | Porter et al. |
| 8,880,300 B2 | | 11/2014 | Gamble et al. |
| 8,984,711 B2 | | 3/2015 | Ota et al. |
| 9,043,953 B2 | | 6/2015 | Sandin et al. |
| 9,057,166 B2 | | 6/2015 | Prager |
| 9,127,691 B2 | | 9/2015 | Hagen et al. |
| 9,192,096 B2 | | 11/2015 | Harris, III |
| 9,301,443 B2 | | 4/2016 | Hashima et al. |
| 9,332,694 B2 | | 5/2016 | Prager |
| 9,486,120 B2 | | 11/2016 | Day |
| 9,861,035 B2 | * | 1/2018 | Kruckeberg ......... A01D 34/008 |
| 9,939,812 B2 | * | 4/2018 | Yamamura ........... A01D 34/008 |
| 10,130,037 B2 | | 11/2018 | Conrad et al. |
| 2005/0091953 A1 | | 5/2005 | Turner et al. |
| 2006/0021315 A1 | * | 2/2006 | Brandon ................ A01D 34/74 |
| | | | 56/14.7 |
| 2006/0059879 A1 | | 3/2006 | Edmond |
| 2006/0070366 A1 | | 4/2006 | Laskowski |
| 2007/0220702 A1 | | 9/2007 | Lauer et al. |
| 2007/0294855 A1 | | 12/2007 | Iida et al. |
| 2008/0001966 A1 | | 1/2008 | Zhang |
| 2008/0086997 A1 | | 4/2008 | Lucas et al. |
| 2009/0065273 A1 | | 3/2009 | Wyatt et al. |
| 2013/0004307 A1 | | 1/2013 | Fukuda et al. |
| 2013/0280108 A1 | | 10/2013 | Bearup et al. |
| 2014/0137527 A1 | * | 5/2014 | Motegi ................ A01D 69/02 |
| | | | 56/10.7 |
| 2015/0182082 A1 | | 7/2015 | Garcia-Otero |
| 2015/0377253 A1 | | 12/2015 | Shibata et al. |
| 2016/0108924 A1 | | 4/2016 | Conrad et al. |
| 2016/0183451 A1 | | 6/2016 | Conrad et al. |
| 2016/0295797 A1 | | 10/2016 | Ito et al. |
| 2016/0298635 A1 | | 10/2016 | Su et al. |
| 2017/0034996 A1 | | 2/2017 | Kruckeberg et al. |
| 2018/0160619 A1 | | 6/2018 | Manji et al. |

FOREIGN PATENT DOCUMENTS

| | | |
|---|---|---|
| EP | 3078252 B1 | 2/2018 |
| WO | 2016109860 | 7/2016 |

OTHER PUBLICATIONS

International Search Report for PCT Application No. PCT/US16/20109 dated May 2, 2017.
Website screenshots from chrome-extension://nlipoenfbbikpbjkpfil-logkoblgpmj/edit.html.
Extended Search Report for related pending European Patent Application No. 19873329.7 dated Sep. 6, 2022.

* cited by examiner

DECK HEIGHT CONTROL SYSTEM

PRIORITY CLAIM AND CROSS-REFERENCE TO RELATED APPLICATION

This application is based on and claims priority to U.S. Provisional Patent Application No. 62/746,658 filed on Oct. 17, 2018, which is incorporated herein by reference in its entirety for all purposes.

FIELD

The present disclosure relates generally to systems for use with lawn mowers. More particularly, the present disclosure relates to a system for controlling the height of a lawn mower deck.

BACKGROUND

When mowing a lawn, the ability to adjust the height of a lawn mower's deck, for instance, to cause the mower to cut the lawn at a different height or to overcome obstacles or irregularities in the lawn, is an important function. This function is commonly accomplished using an apparatus that requires an operator to stop the machine and move a mechanical instrument, such as a lever, to cause the deck to raise or lower. However, such a process can be time consuming and cumbersome.

As such, there is a need for a system through which the height of a lawn mower deck may be more seamlessly adjusted. In some instances, it would be further beneficial if this adjustment could be made without the need to stop the mower. It may also be beneficial for an operator to have the ability to adjust the deck height without the need to remove his or her hands from the mower's operating controls.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

A certain aspect of the present invention provides a system for controlling the height of a mower deck. In this aspect, the system is configured to operate during use of the mower, as the mower travels along a cutting path. Accordingly, in one embodiment, the present invention provides a deck height control system for use with a mower that has a deck positioned at a first height and configured to support a blade motor. The deck height control system comprises an actuator configured to vertically displace the deck from a first height to a second height, a deck system module connected to the actuator, and a control connected to the deck system module. The deck system module is capable of signaling the actuator during operation to displace the deck a particular deck distance in a particular vertical direction necessary to achieve the second height, and the deck system module has a deck height memory capable of storing information relating to deck displacement activity. The control is capable of signaling the particular deck distance and particular vertical direction to the deck system module when engaged by an operator.

Another aspect of the invention provides a battery-operated mower. The battery-operated mower includes a chassis, a deck connected to the chassis and positioned at a first height, an electric actuator connected to the deck and configured to vertically displace the deck from the first height to a second height, a control panel including a deck system module that connects to the actuator, and a control connected to the deck system module. The deck system module is capable of signaling the actuator to displace the deck a particular deck distance and direction necessary to achieve the second height during operation of the mower, and the deck system module has a deck height memory. The control is capable of signaling the particular deck distance and direction to the deck system module during operation of the mower. The deck system module is further configured to store the first height in the deck height memory and to return the deck to the first height when a first displacement signal in a first direction is followed by a sustained second displacement signal in a second direction opposite the first direction.

A further aspect of the invention provides a deck height control system for use with a mower. The deck height control system provides a deck configured to connect to a mower and to support a blade motor, the deck positioned at a first height. A first deck lifting chain is mounted to the deck such that vertical displacement of the first deck lifting chain vertically displaces at least a first portion of the deck. A first deck link bar is connected to the first deck lifting chain by a first chain lift lever. The first chain lift lever translates axial rotation of the first deck link bar into vertical displacement of the first deck lifting chain. A second deck lifting chain is mounted to the deck such that vertical displacement of the second deck lifting chain vertically displaces at least a second portion of the deck. A second deck link bar is connected to the second deck lifting chain by a second chain lift lever. The second chain lift lever translates axial rotation of the second deck link bar into vertical displacement of the second deck lifting chain. A linkage rod connects the first deck link bar to the second deck link bar such that axial rotation of the second deck link bar generates axial rotation of the first deck link bar. An electric linear actuator has an extendable actuator arm that is connected to the second deck link bar by an arm lever, such that displacement of the actuator arm generates axial rotation of the second deck link bar.

A deck system module is connected to the linear actuator and is capable of signaling the linear actuator to displace the actuator arm a particular actuator arm distance and direction required to vertically displace the deck a particular deck distance and direction necessary to achieve a second height, and the deck system module has a deck height memory. A foot control is connected to the deck system module and is capable of signaling the particular deck distance and direction to the deck system module when engaged by an operator.

Further, the deck system module is configured to store the first height in the deck height memory and to return the deck to the first height when a sustained downward displacement signal is received from the control following an upward displacement signal. A blade motor controller is connected to the deck system module. A current sensor is integrated within the blade motor controller and is configured to sense blade motor current. When the sensed current exceeds a predetermined high-load level, the blade motor controller is configured to signal the deck system module. The deck system module, upon receiving the signal from the blade motor controller, is configured to raise the deck from a starting height to a predetermined high-load height for a first predetermined time and to lower the deck to the starting height once the predetermined time has elapsed.

Other objects and advantages of the present disclosure will become apparent hereinafter.

BRIEF DESCRIPTION OF THE DRAWINGS

Embodiments of the deck height control system are disclosed with reference to the accompanying exemplary drawings, which are for illustrative purposes. Various portions of the apparatus may be omitted from illustration in one or more FIGS. in order to provide a view of underlying components. The deck height control system is not limited in application to the details of construction or the arrangement of the components illustrated in the drawings. The deck height control system is capable of other embodiments or of being practiced or carried out in various other ways. In the drawings.

DETAILED DESCRIPTION

Figure 1:
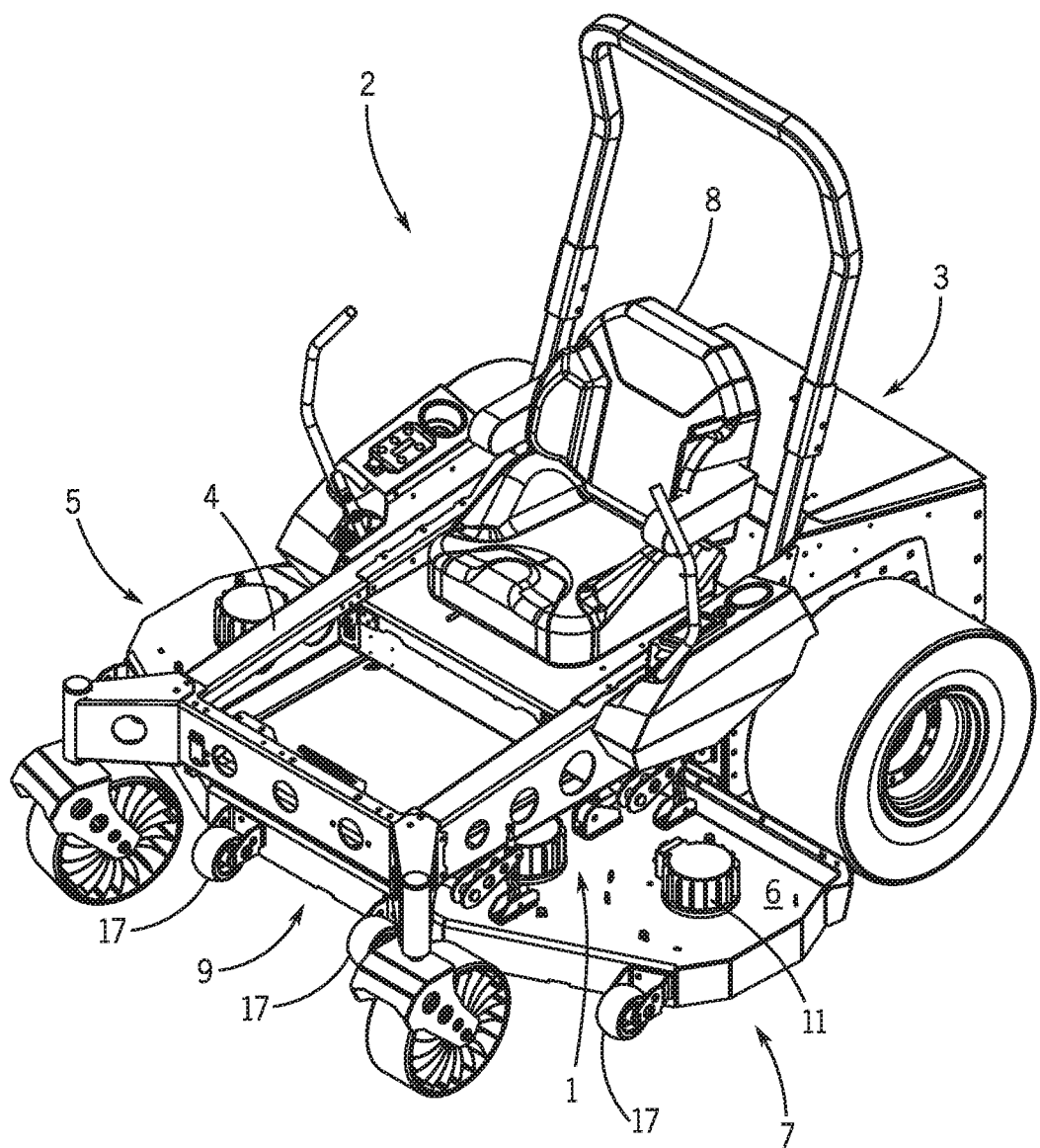
FIG. 1 is a front perspective view of an exemplary mower including a deck and a deck height control system, according to one embodiment of the present disclosure.

Referring to FIG. 1, a perspective view of a mower 2 is provided, the mower 2 comprising a deck height control system 1 according to one embodiment of the present disclosure. In this embodiment, the mower is an electric, battery-operated mower. However, in other embodiments, the deck height control system described here may be configured to function with other types of mowers, such as a gas mower, as long as a power source, such as a battery, is provided to operate the deck height control system. A 12 volt battery is one example of a power source that may suffice in such an embodiment.

The mower 2 may include a chassis 4 that consists of numerous structural members secured together to form a framework (i.e., a frame) for which to interconnect the components of the mower 2, including a deck 6 and an operator support 8. The deck 6 may provide a sturdy structure for which to mount other components, such as one or more blade motors 11, and the deck 6 and may be supported by one or more support rollers 17 for guidance along terrain. In at least some embodiments, the deck 6 is constructed of 7-10 gauge steel or aluminum, while in other embodiments, the deck 6 may be constructed of any of a number of structural compounds including, but not limited to alloys, composites, plastic, or any combination thereof. The operator support 8 may be one of various types of supports, including a sitting chair, a standing pad, etc. Further, in an instance where the mower 2 is to be run autonomously or remotely, the operator support 8 may be omitted entirely. For reference, a rear 3, a right side 5, a left side 7, and a front 9 are further identified in FIG. 1.

Figure 2:
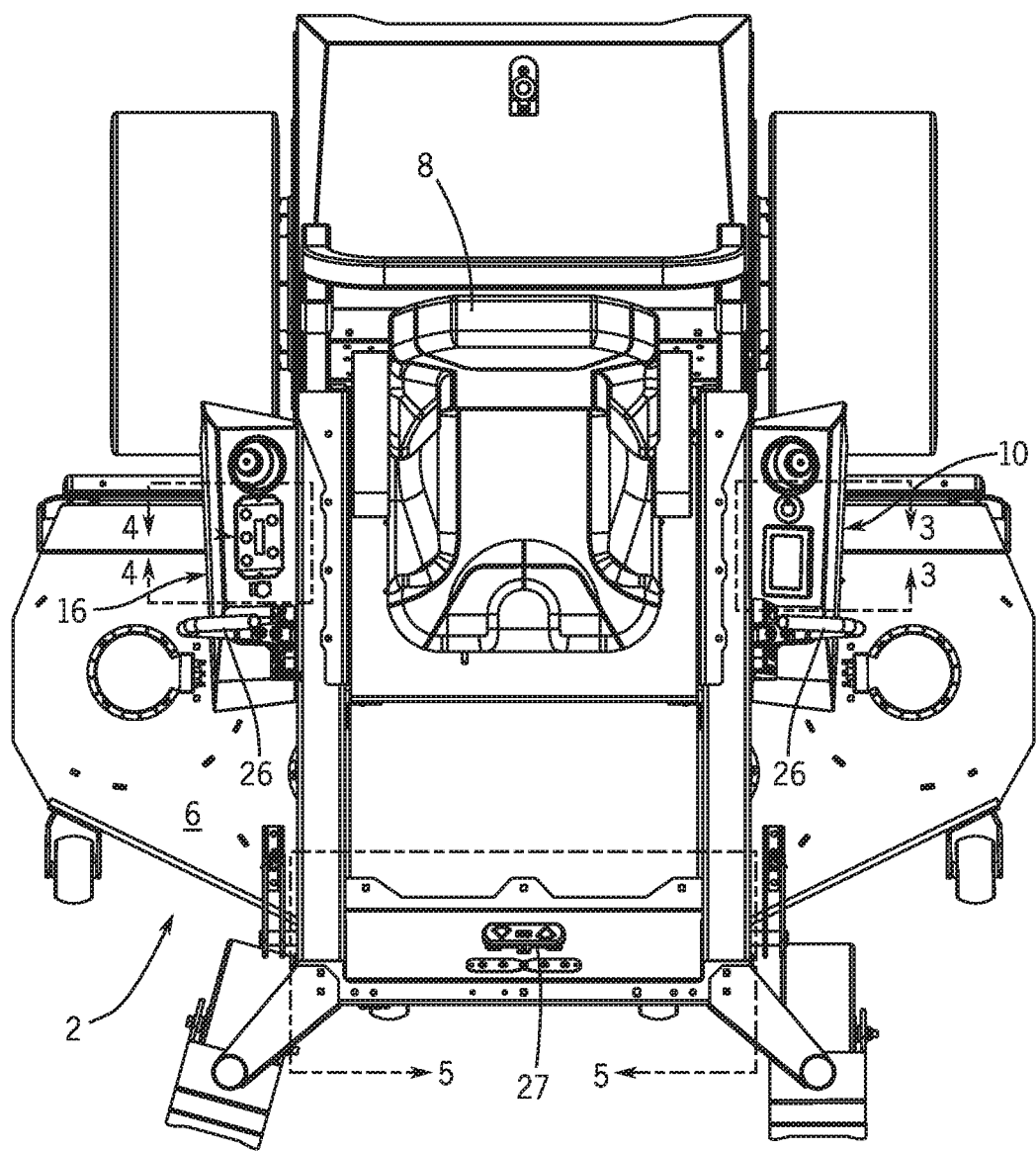
FIG. 2 is a top view of the mower of FIG. 1, including a left control panel, a right control panel, and a foot control.
Figure 3:
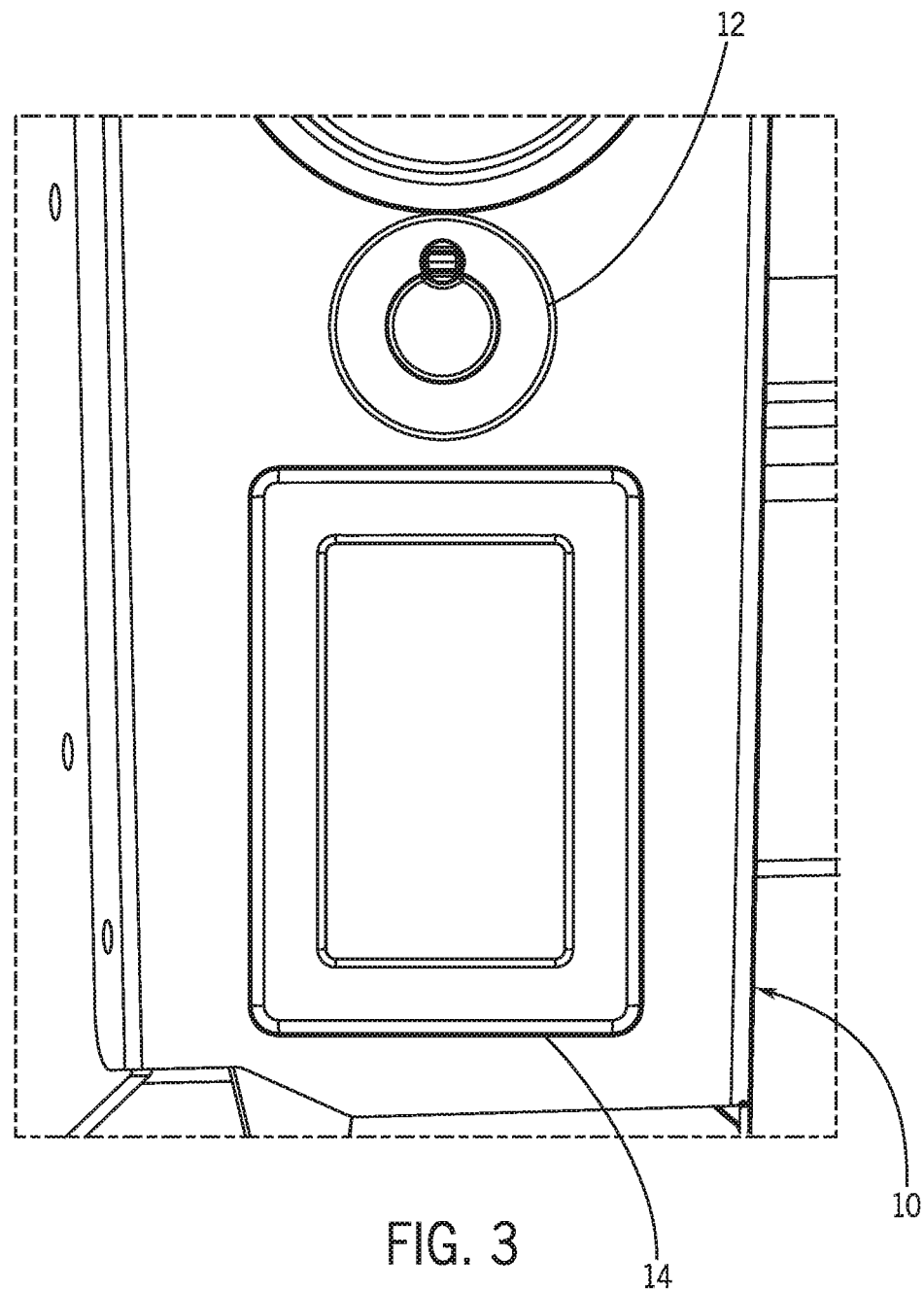
FIG. 3 is an enlarged detail view of the left control panel shown in FIG. 2.

FIG. 2 shows a top view of the mower 2, including a left control panel 10, a right control panel 16, and a foot control 27. An enlarged top view of the left control panel 10 is shown in FIG. 3. Here, the left control panel 10 includes a start control 12 and a system display screen 14. The start control is depicted as a key switch in this embodiment, though it may take other forms in other embodiments, such as a push button switch. When the operator operates the start control 12, a diagnostic system check may be run, and the system display screen 14 may indicate to the operator whether or not all systems of the mower 2 are active, with no faults or errors. In the embodiment shown, the display screen 14 is a touch screen. However, in other embodiments, other forms of display screens may be employed, such a button-controlled screen. In embodiments in which the mower is controlled remotely, the control panels 10, 16 and foot control 27 need not be physically connected to the mower, but in some embodiments, may be located at a remote location, accessible to an operator remotely controlling the mower, and may connect to the mower, for instance, by a wireless connection. Similarly, in an embodiment in which the mower runs autonomously, the control panels 10, 16 and foot control 27, likewise, need not be physically connected to the mower, and in certain embodiments, need not be present, even remotely, as the mower may be programmed to run without the need for commands from external controls.

Figure 4:
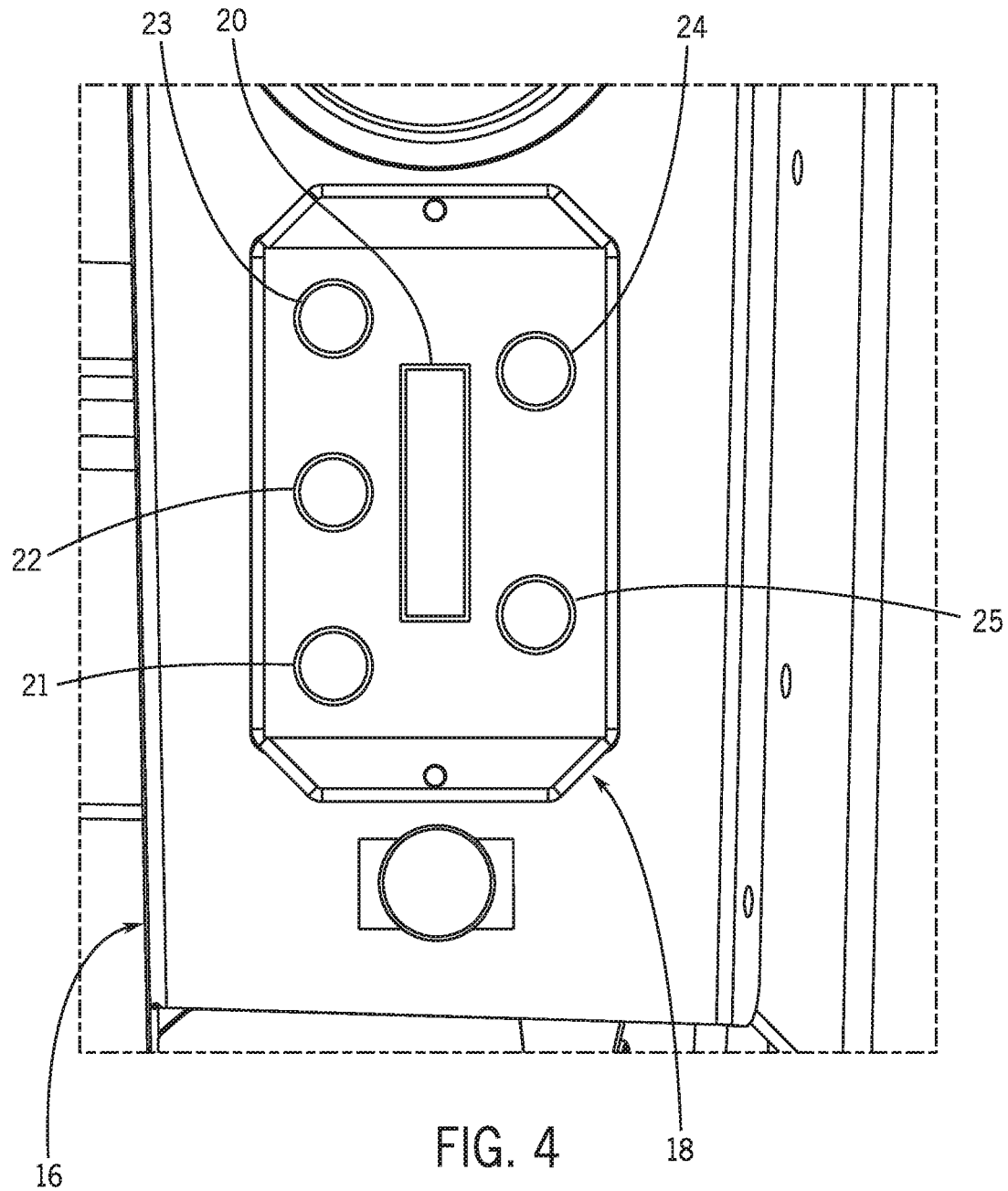
FIG. 4 is an enlarged detail view of the right control panel shown in FIG. 2.

FIG. 4 shows an enlarged top view of the right control panel 16. In the embodiment shown, the right control panel 16 includes a deck system module 18. In this embodiment, the deck system module 18 includes a display screen 20 and buttons 21-25. While five controls in the form of buttons are shown in the embodiment illustrated in FIG. 4, more or fewer controls may be included in other embodiments, and such controls may take forms other than buttons, such as switches, touch screen icons, etc. Further, any of the controls described herein may be located at different areas of the control panels 10, 16 or at other locations of the mower 2 accessible to an operator of the mower 2. Alternatively, such controls may be located at a remote position, accessible to a remote operator and may connect to the mower, for instance, by means of a wireless connection.

When the deck system module 18 is powered on, the display screen 20 may display the present height of the deck 6. In this embodiment, the display screen 20 is an LED display screen, although other forms of display screens are permissible. In certain embodiments, the display screen 20 may be configured to display additional information relating to additional elements that the mower 2 may sense, for instance, drive speed or blade speed. The buttons 21-25 of the deck system module 18 may, likewise, perform various functions. For instance, when engaged by the operator, a button 21 may transition the mower 2 between high and low drive speed modes, another button 22 may transition the mower 2 between high and low blade speed modes, and yet another button 23 may turn on and off one or more lights of the mower 2, such as external or accessory lights. When engaged, button 24 may raise the deck, and button 25 may lower the deck.

In the present embodiment, when the display screen 20 is displaying the deck height, it may adjust the displayed deck height as the height of the deck 6 is adjusted. In this embodiment, a linear actuator 28 is used to effectuate the raising and lowering of the deck 6 by moving an actuator arm 29 connected to the deck 6 (see further connection detail below). Thus, the displacement of the actuator arm 29 correlates to the height change of the deck 6. In the present embodiment, the actuator is an electric linear actuator. It has been found that a Linak LA36 linear actuator may suffice. However, in other embodiments, other forms of actuators may be used, such as a hydraulic actuator. Upon initial calibration of the mower 2, the height of the deck 6 may be measured and the measured height entered into the deck system module 18. During operation of the deck height control system 1, an internal position sensor (not shown) integrated within the linear actuator 28 may then sense the positional change of the actuator arm 29, and the linear actuator 28 may report this position change back to deck system module 18, permitting the deck system module 18 to compute a new deck height, accordingly, and display an accurate deck height on the display screen 20 as the deck 6 changes position. In an embodiment that utilizes a non-electric form of linear actuator, such non-electric linear actuator may include a position sensor capable of communicating displacement of the actuator arm to the deck system module. The above described steps may all occur during operation of the mower 2 along a cutting path, without need to stop the mower 2.

Figure 5:
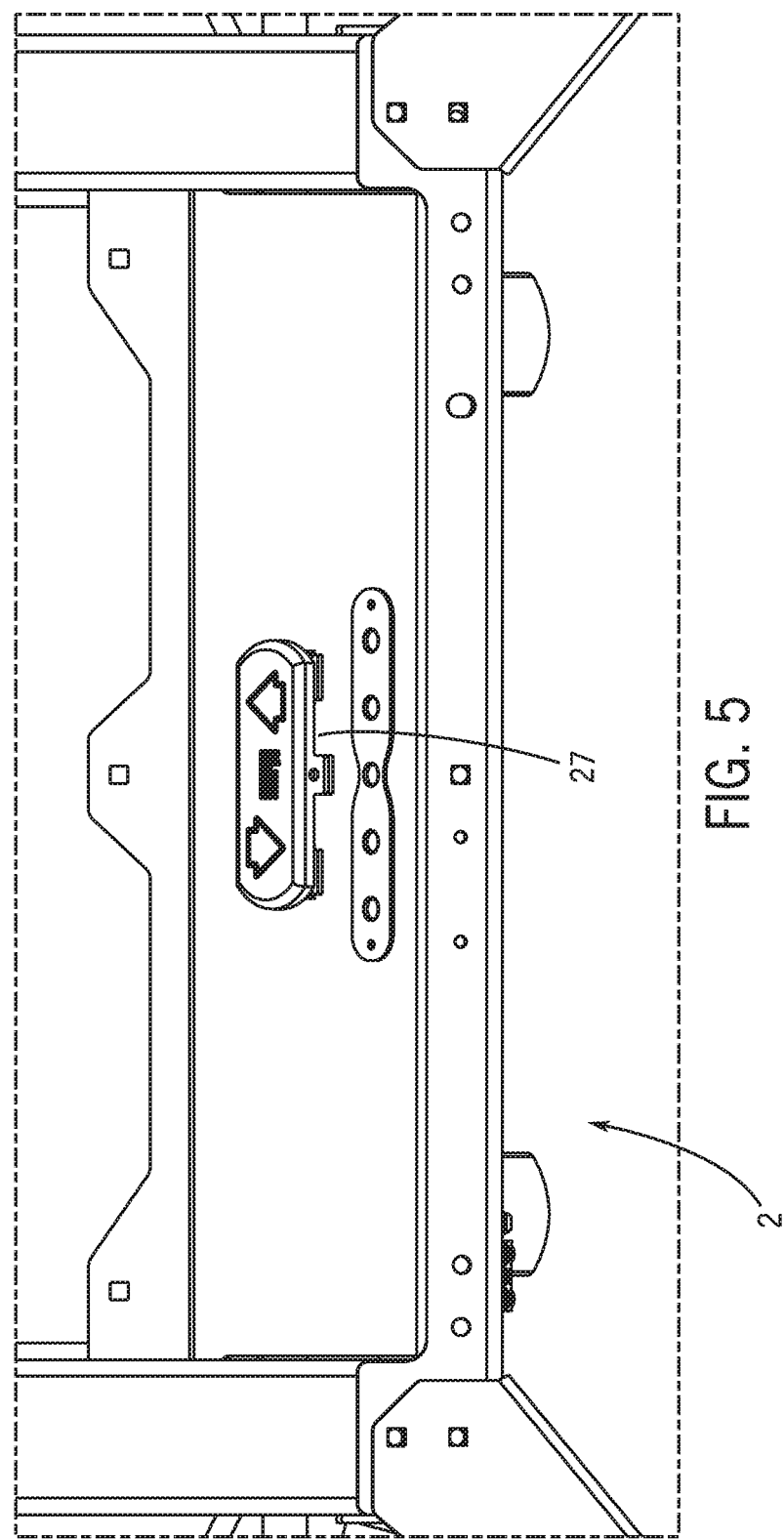
FIG. 5 is an enlarged detail view of the foot control shown in FIG. 2.

Referring to FIG. 5, an enlarged view of the foot control 27 is shown, which may provide an alternate means for raising or lowering the height of the deck 6. The foot control 27 may be connected to the chassis 4. In the embodiment shown, the foot control 27 is illustrated as a single pedal that may be depressed on one side to raise the deck 6 and, on the other side, to lower the deck 6. In other embodiments, the foot control 27 may take other forms, for example, separate up and down controls or a rocker switch that may be rocked by the operator in one direction to raise and, in another direction to lower, the deck height.

In this embodiment, the deck system module 18 includes a deck height memory capable of storing certain information related to deck height. For instance, the deck height memory may store a first height of the deck. When the operator engages the raising side of the foot control 27 (here marked by an "up" arrow from the operator's perspective), the deck 6 will be raised from the first height to a second height. When the operator then engages the lowering side of the foot control 27 (here marked by a "down" arrow from the operator's perspective), the deck 6 will be lowered from a second height to a third height, below the second height. If the lowering side of the foot control 27 is held for a sustained period of time, the deck 6 will continue to lower until the original first deck height is reached, at which point the deck 6 will stop lowering. If the operator wishes to then lower the deck height to a height below the original first height, the lowering side of the foot control 27 may be again engaged. The deck height memory allows for quick and seamless maneuvering around obstacles in a lawn, such as tree stumps, while maintaining an even lawn height along the general cutting path. Here, the operator avoids having to start and stop the mower to adjust the deck height before and after the obstacle and, in an embodiment including the foot control 27, the operator additionally maintains the use of both hands on the mower control bars 26 throughout the raising and lowering process as the mower 2 continues to move along its path. Alternatively, the controls associated with a the foot control 27 could be adapted to take the form of a hand-operated control positioned on one or both of the control bars 26, still allowing the operator to conveniently raise or lower the height of the deck 6 while maintaining both hands on the control bars 26.

Figure 6:
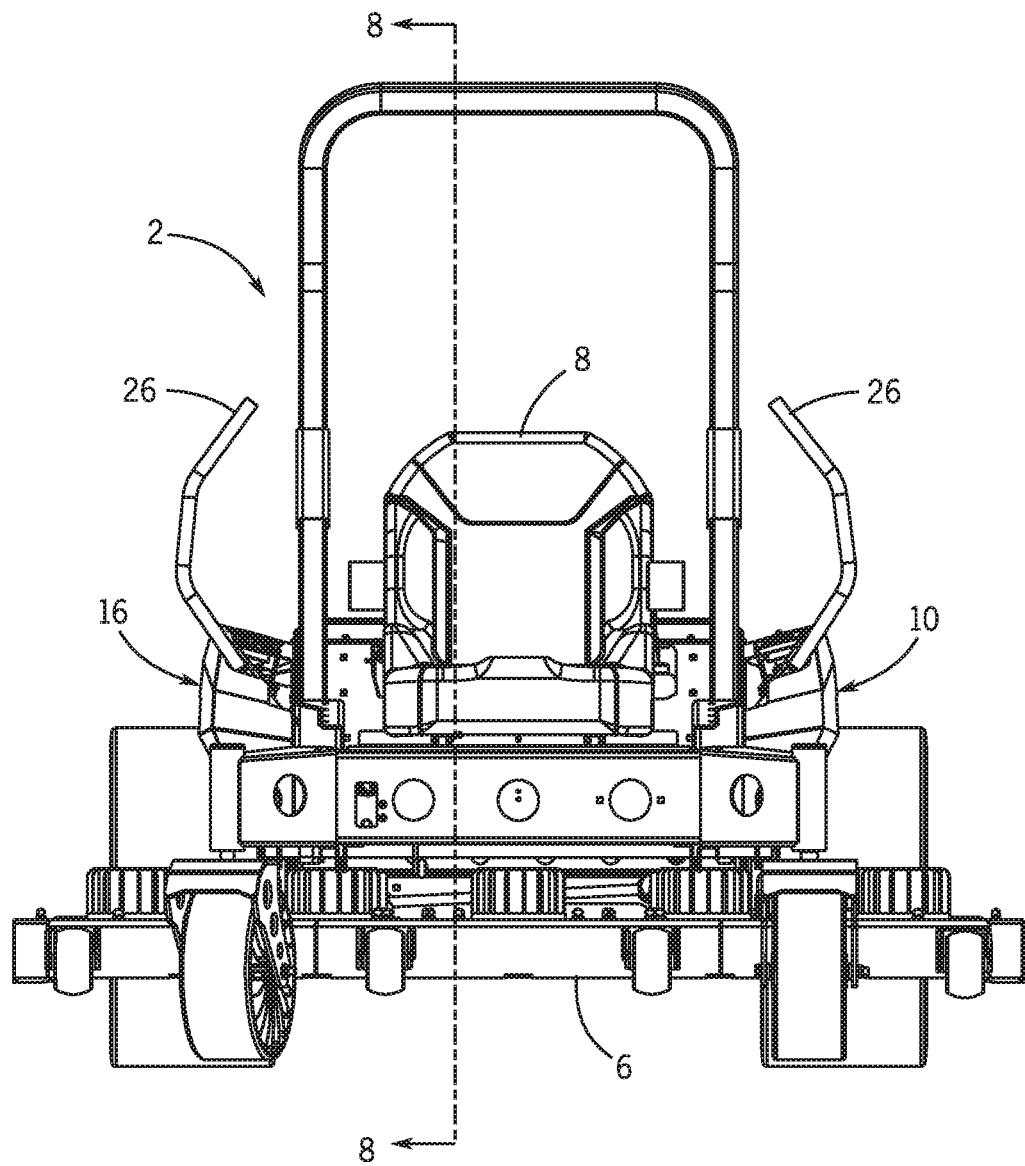
FIG. 6 is a front view of the mower of FIG. 1.
Figure 7:
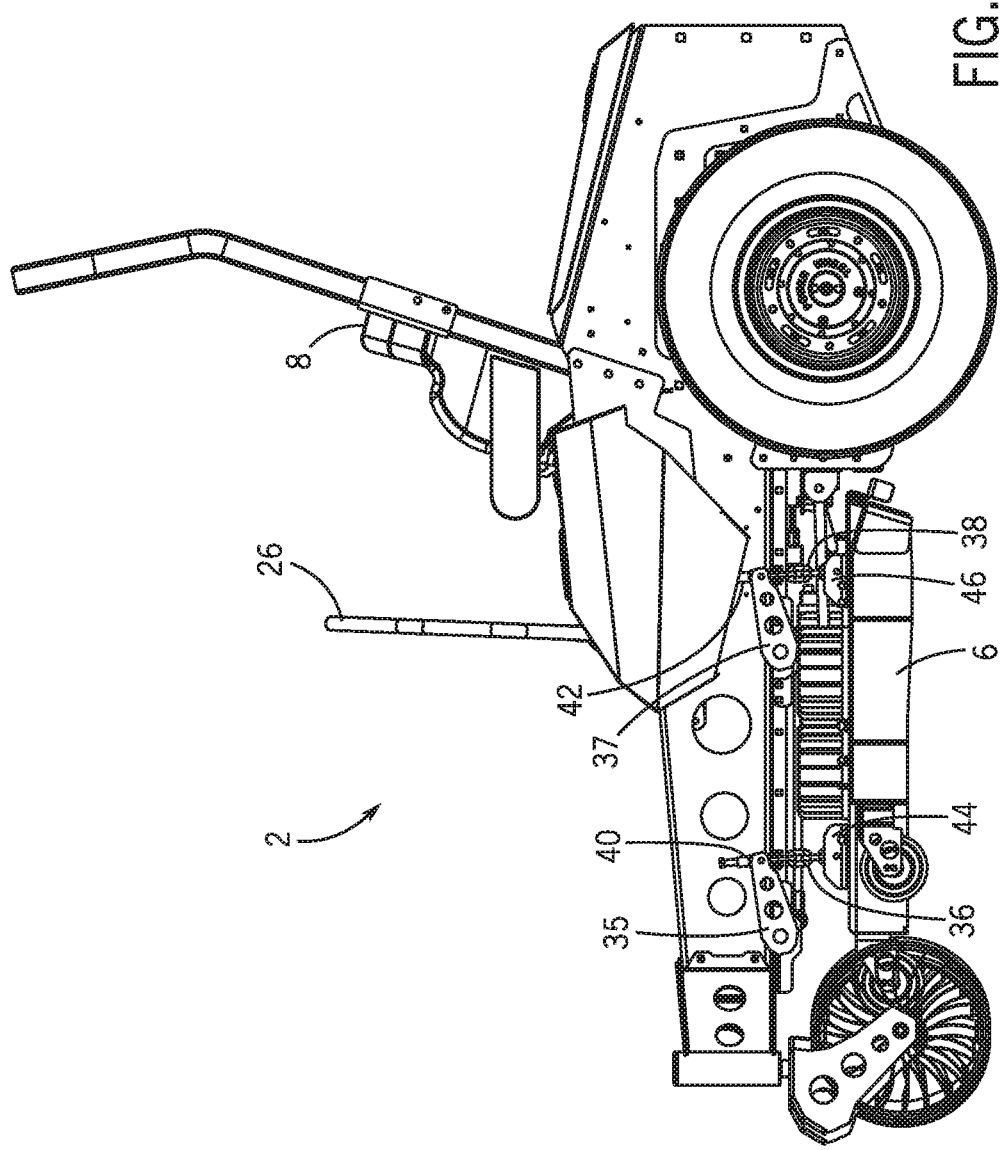
FIG. 7 is a left side view of the mower of FIG. 1.
Figure 8:
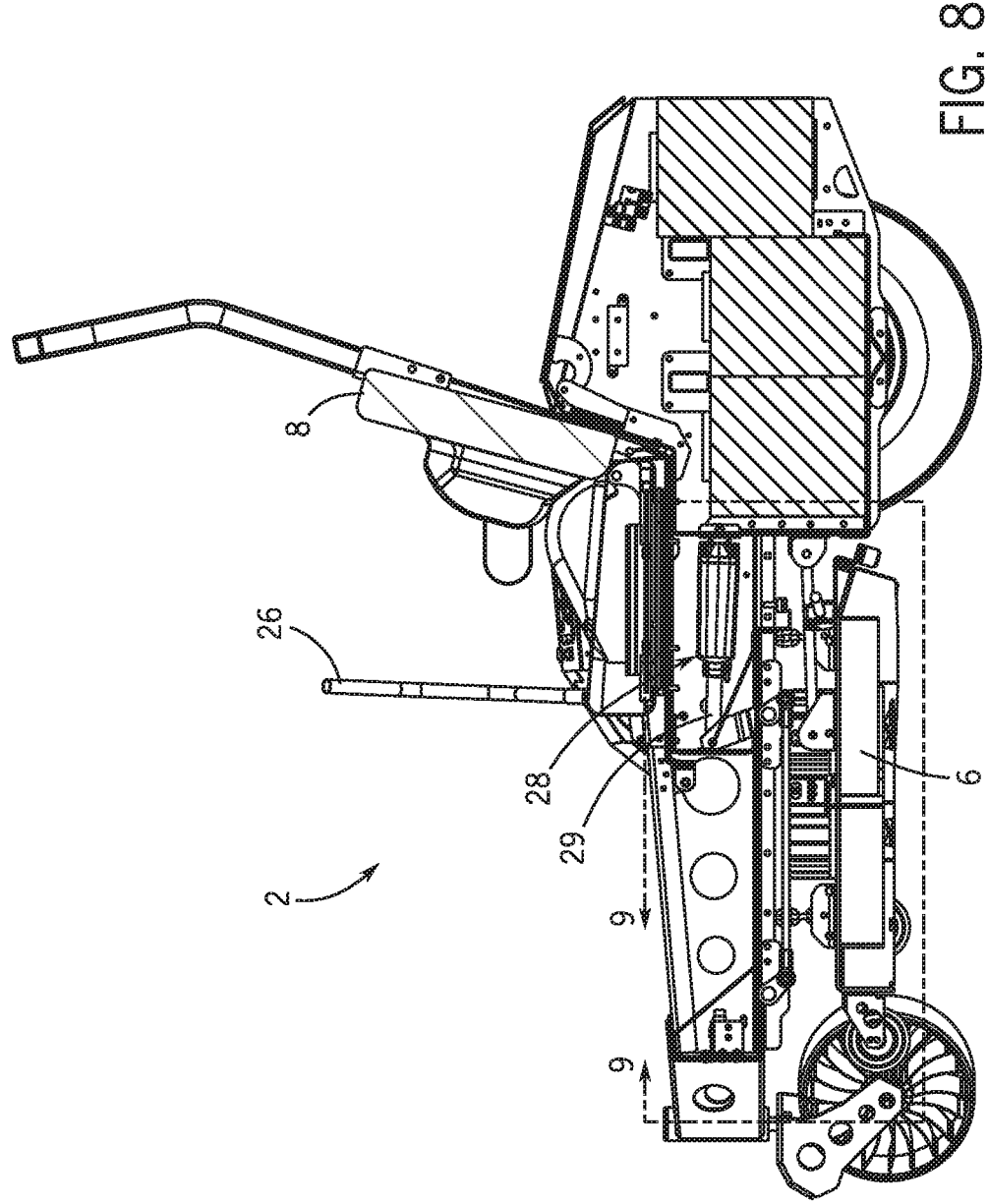
FIG. 8 is a cross sectional view of the mower of FIG. 6, taken along line 8-8, showing certain internal parts of a deck height control system, including a linear actuator.
Figure 9:
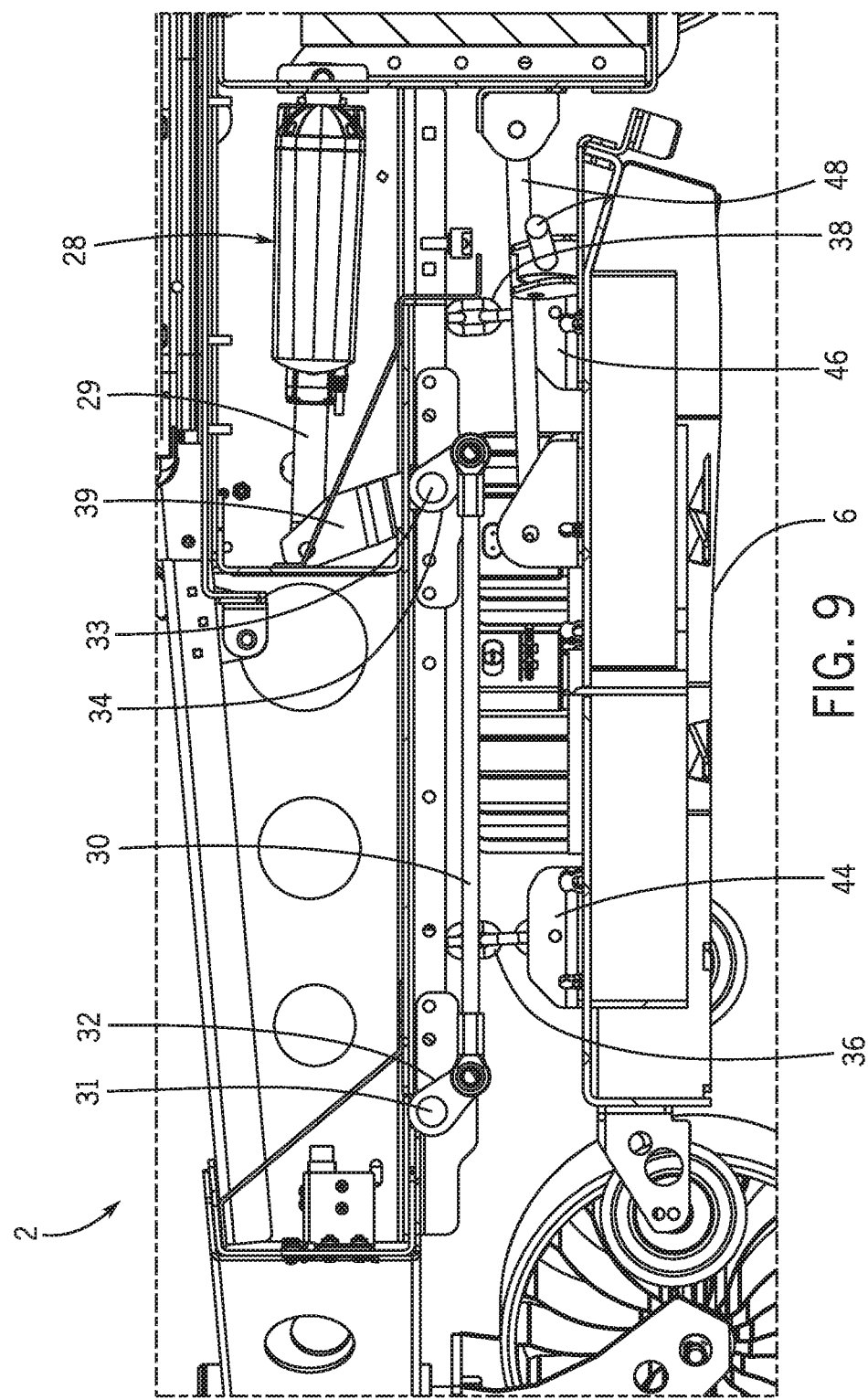
FIG. 9 is an enlarged detail view of the cross sectional view shown in FIG. 8.
Figure 10:
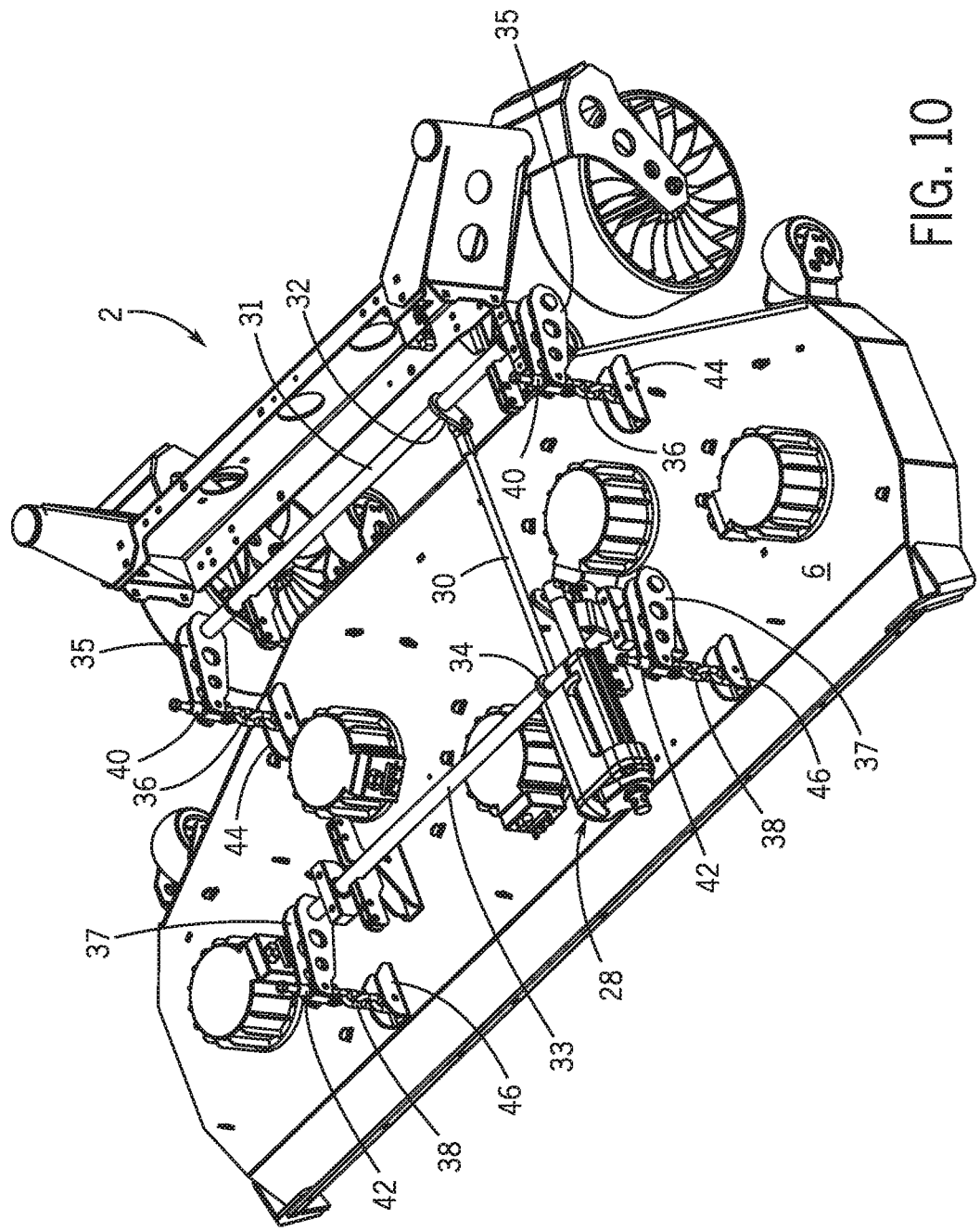
FIG. 10 is a perspective view of the deck of the mower of FIG. 1 and certain parts of the deck height control system.
Figure 11:
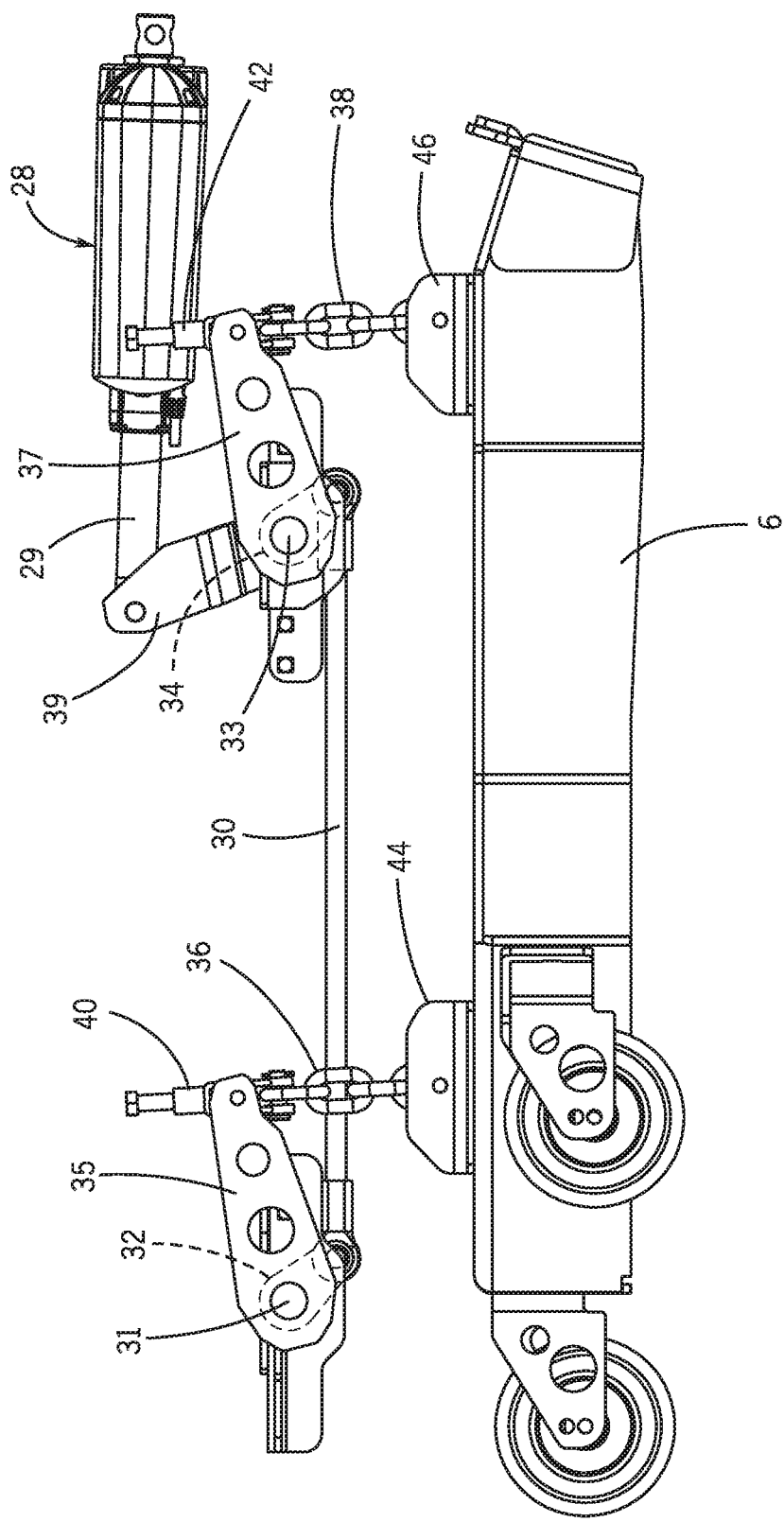
FIG. 11 is a left side view of the deck and deck height control system parts shown in FIG. 10.
Figure 12:
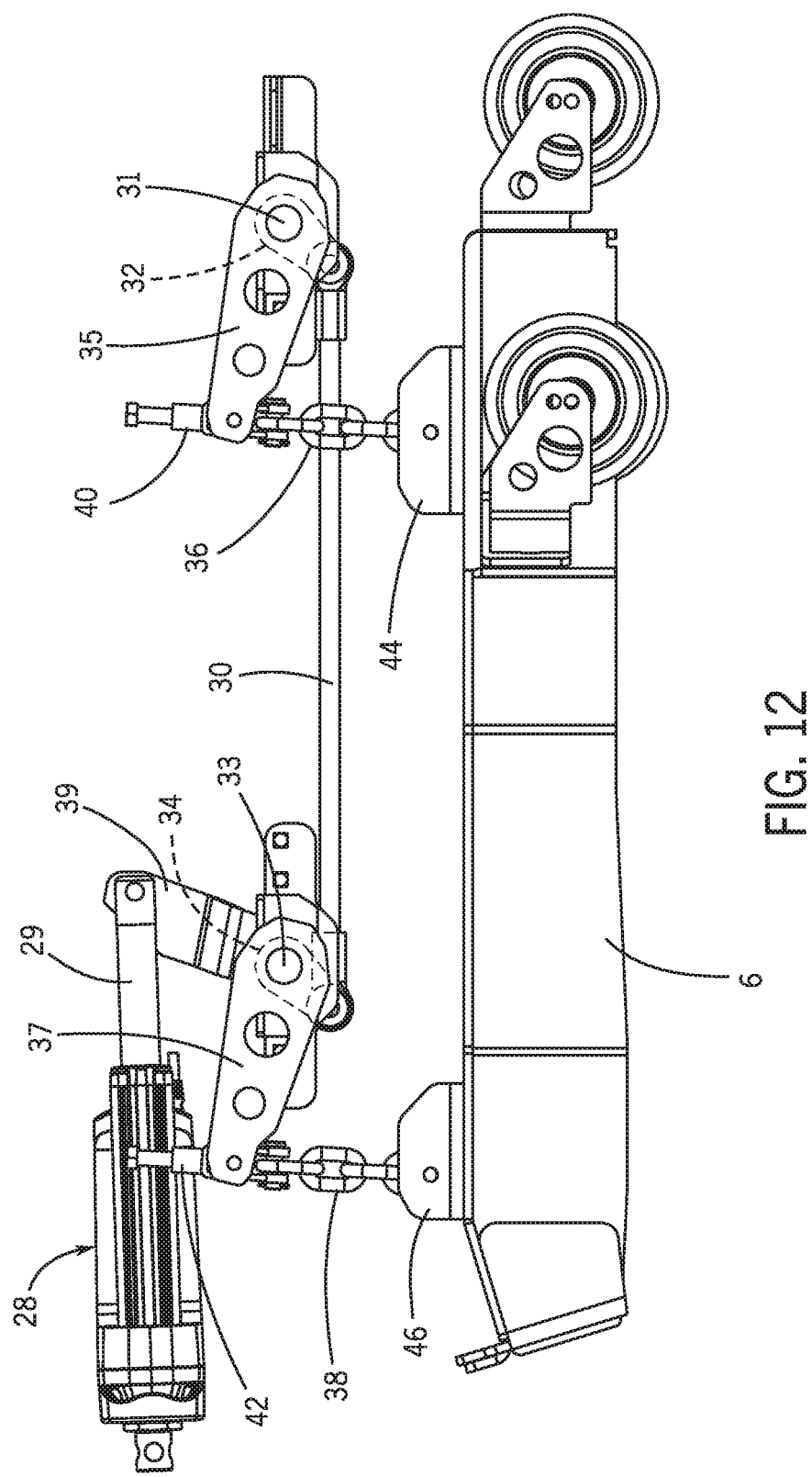
FIG. 12 is a right side view of the deck and deck height control system parts shown in FIG. 10.
Figure 13:
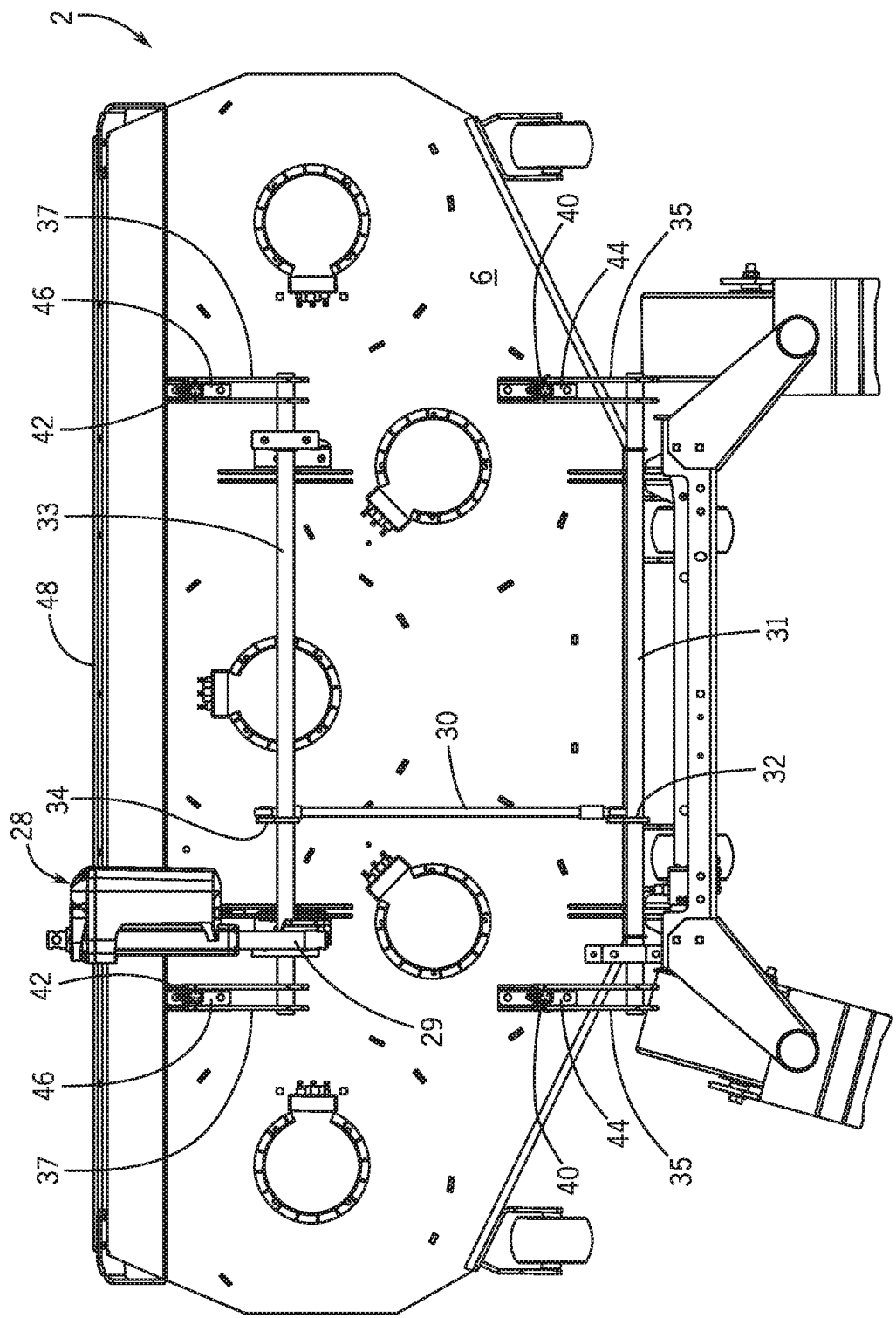
FIG. 13 is a top view of the deck and deck height control system parts shown in FIG. 10.

FIG. 7 shows as left side view of the mower 2. FIG. 8 then cuts away a portion of the mower to show a cross sectional view of the mower 2, taken along line 8-8 of FIG. 6 and showing certain interior components of the deck height control system 1. FIG. 9 shows an enlarged view of the deck height control system parts shown in FIG. 8, and FIGS. 10-13 show various views of the deck 6 and certain deck height control system components, with the remainder of the mower removed for clarity.

Figure 14:
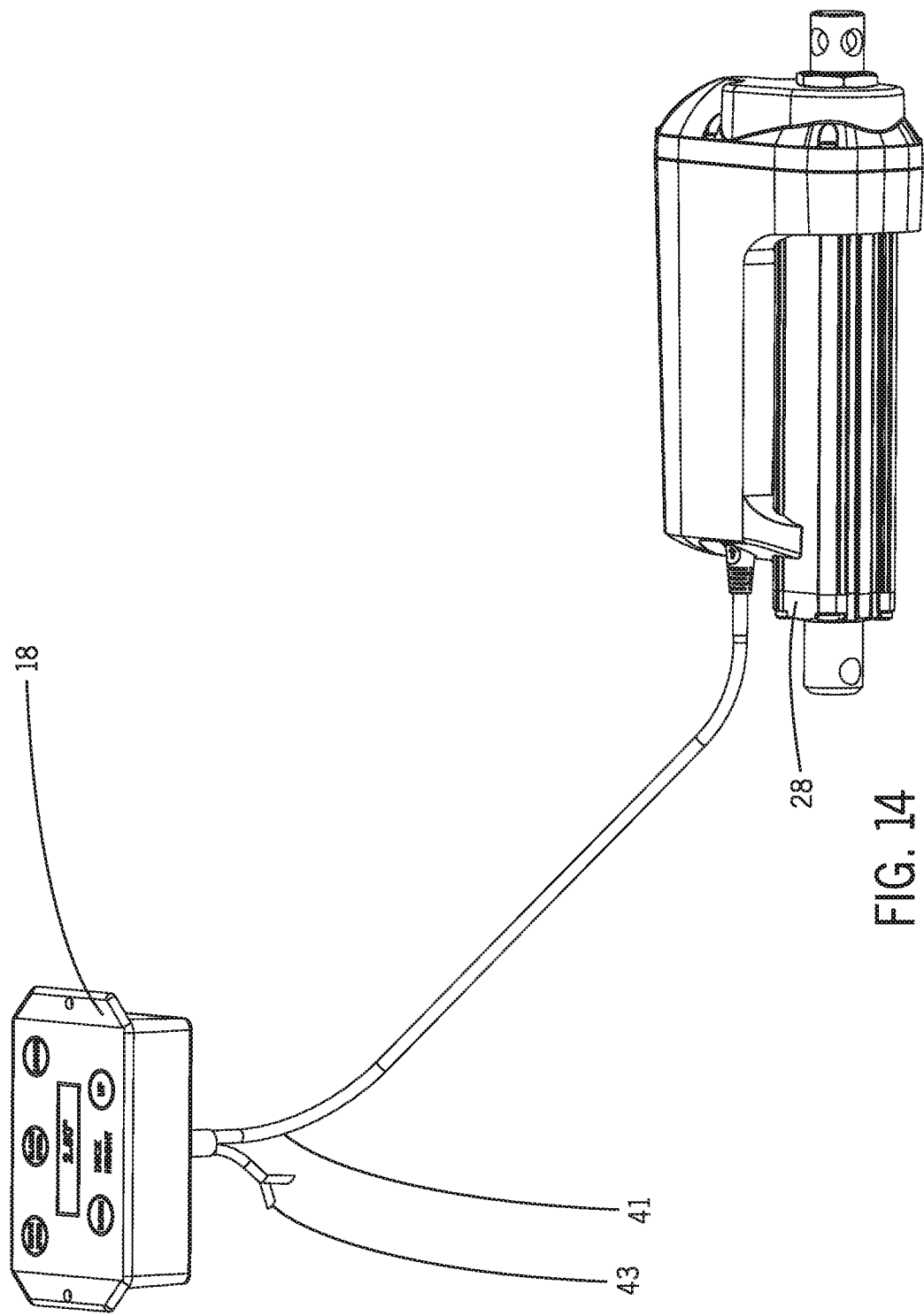
FIG. 14 is a schematic view of the connection between the linear actuator shown in FIGS. 8-13 and a deck system module, and a CAN bus wire for connecting the deck system module to a CAN bus system, according to one embodiment of the present disclosure.

Referring to FIG. 14, a schematic drawing is shown of the deck system module 18 connected to the linear actuator 28 via a connector 41, along with a set of CAN bus wires 43 that extend from the deck system module 18 and may connect the deck system module 18 to a central CAN bus system of the mower 2. While, in this embodiment, a CAN bus system is used to connect various electric elements of the mower 2, similar mower components may be connected by alternative means in other embodiments. During operation, when the operator signals the system to raise or lower the deck 6, for instance, by one of the means described above, the signal is received and processed by the deck system module 18, and a related signal is then sent from the deck system module 18 to the linear actuator 28, via the connector 41. The linear actuator 28 may then move the actuator arm 29 a distance that correlates to the desired change in deck height. In this embodiment, the linear actuator 28 is an electric actuator, but other types of actuators may be used. The signal may be provided by an operator positioned on the mower 2, or from a remote location. If the signal originates from a location spaced apart from the deck system module 18, such as from the foot control 27, the signal may be transmitted via the CAN bus system and reach the deck system module 18 through one or more of the CAN bus wires 43.

Referring to FIGS. 8-13, the actuator arm 29 may connect to a rear deck link bar 33 via an actuator arm lever 39. The rear deck link bar 33 may connect a set of rear chain lift levers 37, one positioned generally on the left side of the deck 6 and the other, generally on the right, in the present embodiment. In this embodiment, each of the rear chain lift levers 37 are connected to a rear deck lifting chain 38, and each rear deck lifting chain 38 is connected to the deck 6 by a rear deck chain mount 46. In the embodiment shown, the rear chain lift lever 37 is connected to the deck lifting chain 38 by means of a rear clevis fastener 42. However, other forms of fasteners may be permissible in other embodiments. As the actuator arm 29 linearly displaces, the actuator arm lever 39 may axially rotate the rear deck link bar 33, causing each of the rear chain lift lever 37 to simultaneously rotate about the longitudinal axis of the rear deck link bar 33, raising or lowering each rear clevis fastener 42, in turn raising or lowering each rear deck lifting chain 38, and thus, uniformly raising or lowering the rear of the deck 6. The rear deck link bar 33 provides uniformity between the left and right sides of the deck 6 as the rear of the deck 6 is raised or lowered.

In the present embodiment, the rear deck link bar 33 additionally connects to a linkage rod 30 by a rear lift arm 34, and the linkage rod 30, in turn, connects to a front deck link bar 31 via a front lift arm 32, such that axial rotation of the rear deck link bar 33 results in corresponding axial rotation of the front deck link bar 31. Similarly to the rear deck link bar 33, the front deck link bar 31 connects a set of front chain lift levers 35, one positioned generally on the left side of the deck 6 and the other, generally on the right, in the present embodiment. In this embodiment, each of the front chain lift levers 35 is connected to a front deck lifting chain 36, and each front deck lifting chain 36 is connected to the deck 6 by a front deck chain mount 44. In the embodiment shown, the front chain lift lever 35 is connected to the deck lifting chain 36 by means of a front clevis fastener 40. However, other forms of fasteners may be permissible in other embodiments. As the linkage rod 30 displaces, the front lift arm 32 may axially rotate the front deck link bar 31, causing each of the front chain lift levers 35 to simultaneously rotate about the longitudinal axis of the front deck link bar 31, raising or lowering each front clevis fastener 40, in turn, uniformly raising or lowering each front deck lifting chain 36, and thus, uniformly raising or lowering the front of the deck 6. The front deck link bar 31 provides uniformity between the left and right sides of the deck 6 as the front of the deck 6 is raised or lowered. Likewise the linkage rod 30 and corresponding provide uniformity between the front and rear of the deck 6 as the entirety of the deck 6 is raised or lowered.

As an example, in this embodiment, when the actuator arm 29 is extended, the actuator arm lever 39 axially rotates the rear deck link bar 33 in a forward direction, toward the front of the mower 2. The forward rotation of the rear deck link bar 33 causes the rear chain lift levers 37 to likewise rotate in a forward direction, thus raising the rear deck lifting chains 38, and ultimately raising the rear portion of the deck 6. In the embodiment shown, the forward rotation of the rear deck link bar 33 additionally generates rearward motion of the linkage rod 30, which in turn generates forward rotation of the front deck link bar 31. The forward rotation of the front deck link bar 31, causes the front chain lift levers 35 to likewise rotate in a forward direction, thus raising the front deck lifting chains 36, and ultimately raising the front portion of the deck 6 in substantial uniformity with the raising of the rear portion of the deck 6. Additionally, to stabilize the deck 6 as it raises a lowers, one or more deck stabilizer bars 48 may connect the deck 6 to the chassis 4 of the mower 2.

When desired to ensure that the deck height control system 1 does not lower the deck 6 below a set minimum deck height, a set minimum deck height may be programmed into the deck system module 18. In some embodiments, the set minimum deck height may be passcode protected, for instance, by a supervisor, so that an operator may be prevented from overriding the set minimum deck height. The passcode could take the form of a series of numbers, letters, symbols, etc. Further, in certain embodiments, the minimum deck height may be pre-programmed in the deck system module 18 in relation to a GPS signal. For instance, if mowing a first lawn and a second lawn next to one another, when the a locational sensor, positioned on the mower 2 and electrically connected to the deck system module, senses that the mower has reached the second lawn, it can signal a raising or lowering of the deck 6 to accommodate different desired lawn heights as between the first and second lawns. Further still, in some embodiments, in response to certain factors entered by the operator, the deck system module 18 itself could program a proper minimum deck height in order to avoid operator mistakes. For instance, if the operator knows before beginning to mow a given lawn that there are sewer lids sticking up at certain heights within the lawn, the operator may enter the height of each obstacle, and the deck system module 18 could be programmed to restrict the deck from lowering below the height of the tallest recorded obstacle. Alternatively, the deck system module 18 could be programmed to learn the areas where problematic obstacles exist, by recording locations where the deck is raised or lowered in a given lawn and storing those locations in its memory for future automatic raising and lowering of the deck 6 upon later use with respect to the same lawn. In a further alternative, a camera or other form of visual sensor may be positioned on the mower 2, such that the visual sensor is capable of sensing obstacles in the cutting path of the mower 2, raising the deck 6 to overcome a particular sensed obstacle, and lowering the deck 6 once the particular sensed obstacle has been overcome.

Figure 2A:
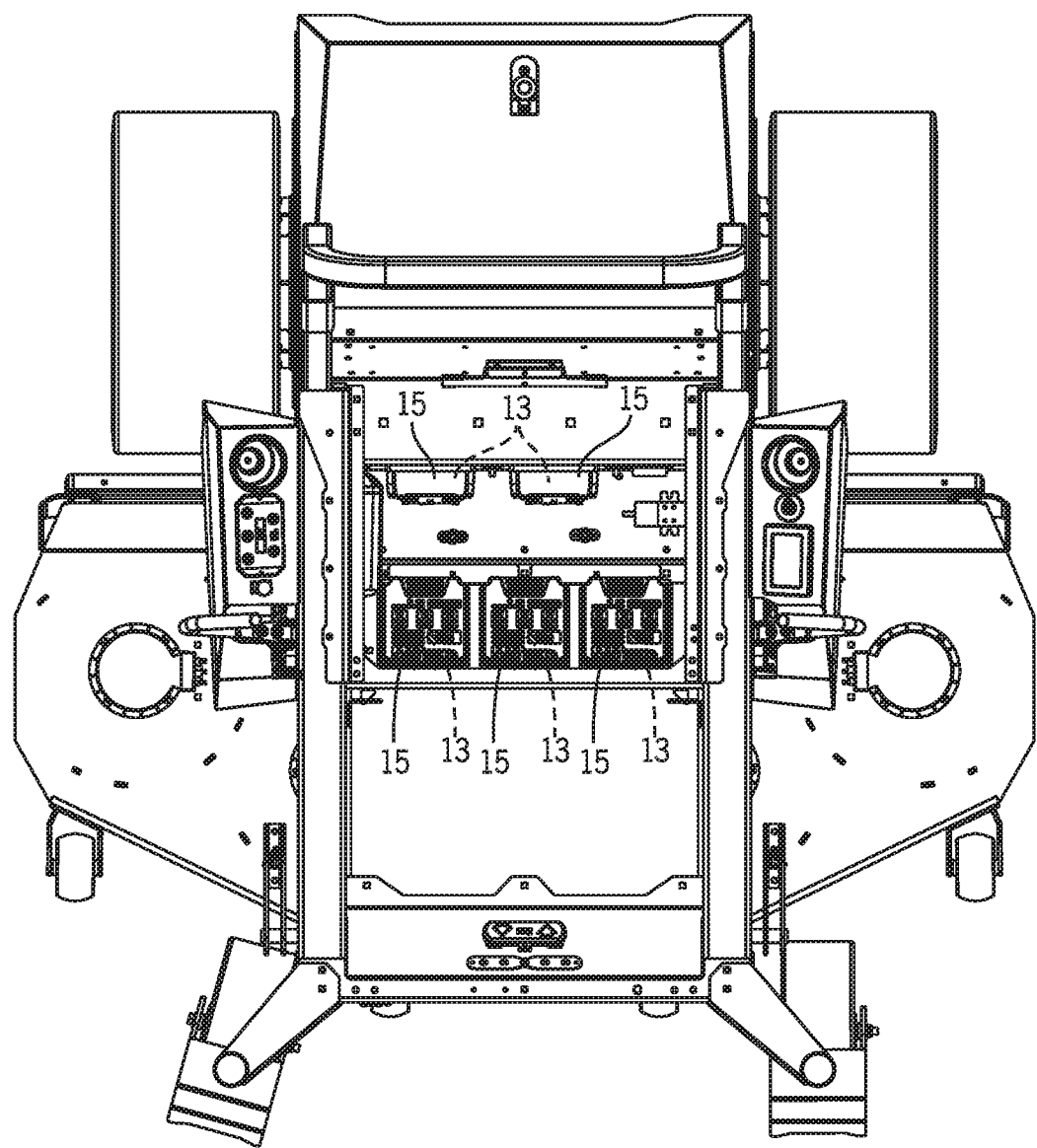
FIG. 2A is a top view of the mower shown in FIG. 2, with the operator support and various support parts located beneath the operator support removed to show interior blade motor controllers of the mower.

The mower 2, in conjunction with the deck system module 18, may further be configured to perform a load sensing automatic deck height control process. By monitoring various parameters sensed by the mower 2, such as blade speed and current flow to the one or more blade motors 11, the height of the deck 6 may be automatically adjusted during the mowing process to accommodate varying load conditions experienced by one or more of the blade motors 11. For instance, referencing FIG. 2A, a current sensor 13 is positioned within the blade motor controller 15 of the mower 2. If the current sensor 13 senses a high power load on one or more of the blade motors 11, for example, when a particularly dense, tall, or wet patch of grass is encountered by the mower 2, the blade motor controller 15 may signal the deck system module 18 to raise the deck 6 to a predetermined height or by a predetermined distance until the mower 2 has overcome the high power load condition. It has been found that raising the deck even a small amount, for example, by a quarter inch, can significantly relieve the loading on the blade motor 11.

In at least some embodiments, when a predetermined high load condition is experienced for a predetermined high-load time, the deck system module 18 may be programmed to raise the deck 6 for a predetermined period of raised-height time or until it is sensed that that the load experienced by the one or more blade motors 11 has reduced, at which point the system may then lower the deck 6 back to the height at which the deck 6 was previously positioned, prior to being raised to overcome the high load condition. For instance, in one example, if a current sensor 13 of the mower 2 senses that the current load has reached or exceeded 60A for greater than three seconds, the current sensor 13 may send a signal to the deck system module 18, and the deck system module 18 may be programmed to raise the deck 6 a quarter inch for five seconds, before lowering the deck 6 back to its initial height. In some embodiments, in an instance where the deck 6 lowers to its original height, only for the blade motor 11 to reencounter a high load condition, the deck system module 18 may raise the deck 6 once more for the predetermined time, and should this cycle repeat a predetermined number of times, the deck system module 18 may automatically increase the predetermined time for which the deck 6 remains raised.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

The invention claimed is:

1. A battery-operated mower comprising:
    a chassis;
    a deck connected to the chassis and positioned at a first height;
    an electric actuator connected to the deck and configured to vertically displace the deck from the first height to a second height;
    a control panel including a deck system module that connects to the actuator, the deck system module capable of signaling the actuator to displace the deck a particular deck distance and direction necessary to achieve the second height during operation of the mower, the deck system module having a deck height memory; and
    a control connected to the deck system module and capable of signaling the particular deck distance and direction to the deck system module during operation of the mower,
    wherein the deck system module is configured to store the first height in the deck height memory and to return the deck to the first height when a first displacement signal in a first direction is followed by a sustained second displacement signal in a second direction opposite the first direction;
    and wherein a first time the mower traverses a cutting path, the deck height memory is configured to store a particular location along the cutting path at which the deck is vertically displaced to a particular height, and to signal the deck system module to displace the deck to the particular height when the mower reaches the particular location another time the mower traverses the cutting path.

2. The mower of claim 1, wherein the control comprises one or more buttons.

3. The mower of claim 2, wherein the control is located on the mower, accessible by an operator positioned on the mower.

4. The mower of claim 1, wherein the deck height memory stores a minimum deck height below which the deck will not be permitted to lower.

5. The mower of claim 1, wherein the control comprises a foot control mounted to the chassis and connected to the deck system module by a CAN bus system.

6. The mower of claim 1, wherein the deck system module is connected to the actuator by a wired connector.

7. The mower of claim 1, wherein the actuator is a linear actuator having an extendable actuator arm, and the mower further comprising a first deck lifting chain mounted to the deck such that vertical displacement of the first deck lifting chain vertically displaces at least a first portion of the deck; a second deck lifting chain mounted to the deck such that vertical displacement of the second deck lifting chain vertically displaces at least a second portion of the deck; a first deck link bar connected to the first deck lifting chain by a first chain lift lever to translate axial rotation of the first deck link bar into vertical displacement of the first deck lifting chain and to the second deck lifting chain by a second chain lift lever to translate axial rotation of the first deck link bar into vertical displacement of the second deck lifting chain; a third deck lifting chain mounted to the deck such that vertical displacement of the third deck lifting chain vertically displaces at least a third portion of the deck; a fourth deck lifting chain mounted to the deck such that vertical displacement of the fourth deck lifting chain vertically displaces at least a fourth portion of the deck; a second deck link bar connected to the third deck lifting chain by a third chain lift lever to translate axial rotation of the second deck link bar into vertical displacement of the third deck lifting chain and to the fourth deck lifting chain by a fourth chain lift lever to translate axial rotation of the second deck link bar into vertical displacement of the fourth deck lifting chain, the second deck link bar connected to the actuator arm such that displacement of the actuator arm generates axial rotation of the second deck link bar; and a linkage rod connected to the first deck link bar and to the second deck link bar such that axial rotation of the second deck link bar generates axial rotation of the first deck link bar.

8. A deck height control system for use with a mower, the deck height control system comprising:
    a deck configured to connect to a mower and to support a blade motor, the deck positioned at a first height;
    a first deck lifting chain mounted to the deck such that vertical displacement of the first deck lifting chain vertically displaces at least a first portion of the deck;
    a first deck link bar connected to the first deck lifting chain by a first chain lift lever to translate axial rotation of the first deck link bar into vertical displacement of the first deck lifting chain;
    a second deck lifting chain mounted to the deck such that vertical displacement of the second deck lifting chain vertically displaces at least a second portion of the deck;
    a second deck link bar connected to the second deck lifting chain by a second chain lift lever to translate axial rotation of the second deck link bar into vertical displacement of the second deck lifting chain;
    a linkage rod connected to the first deck link bar and to the second deck link bar such that axial rotation of the second deck link bar generates axial rotation of the first deck link bar;
    an electric linear actuator having an extendable actuator arm, the actuator arm connected to the second deck link bar by an arm lever, such that displacement of the actuator arm generates axial rotation of the second deck link bar;
    a deck system module connected to the linear actuator and capable of signaling the linear actuator to displace the actuator arm a particular actuator arm distance and direction required to vertically displace the deck a particular deck distance and direction necessary to achieve a second height, the deck system module having a deck height memory;
    a foot control connected to the deck system module and capable of signaling the particular deck distance and direction to the deck system module when engaged by an operator,
    wherein the deck system module is configured to store the first height in the deck height memory and to return the deck to the first height when a sustained downward displacement signal is received from the control following an upward displacement signal;

a blade motor controller connected to the deck system module; and a current sensor integrated within the blade motor controller and configured to sense blade motor current, wherein the blade motor controller is configured to signal the deck system module when the sensed current exceeds a predetermined high-load level, wherein the deck system module, upon receiving the signal from the blade motor controller, is configured to raise the deck from a starting height to a predetermined high-load height for a first predetermined time, wherein the deck system module is configured to lower the deck to the starting height once the first predetermined time has elapsed; and wherein the deck system module is configured to raise the deck from the starting height to the predetermined high-load height for a second predetermined time, the second predetermined time longer than the first predetermined time, after the deck has been raised to the predetermined high-load height and lowered to the starting height a predetermined number of consecutive times.

9. The deck height control system of claim 8, wherein the foot control is connected to the deck system module by a CAN bus system and wherein the deck system module is connected to the linear actuator by a wired connector.

10. The deck height control system of claim 8, further comprising a third deck lifting chain mounted to the deck such that vertical displacement of the third deck lifting chain vertically displaces at least a third portion of the deck, the third deck lifting chain connected to the first deck link bar by a third chain lift lever to translate axial rotation of the first deck link bar into vertical displacement of the third deck lifting chain, substantially simultaneous with the vertical displacement of the first deck lifting chain; and a fourth deck lifting chain mounted to the deck such that vertical displacement of the fourth deck lifting chain vertically displaces at least a fourth portion of the deck, the fourth deck lifting chain connected to the second deck link bar by a fourth chain lift lever to translate axial rotation of the second deck link bar into vertical displacement of the fourth deck lifting chain, substantially simultaneous with the vertical displacement of the second deck lifting chain.

\* \* \* \* \*